United States Patent [19]

Morimura et al.

[11] 4,341,397
[45] Jul. 27, 1982

[54] STABILIZING DEVICE FOR A SUSPENSION OF AN AUTOMOTIVE VEHICLE

[75] Inventors: Hiroaki Morimura, Yokohama; Masanori Abe, Kawasaki, both of Japan

[73] Assignee: Nissan Motor Co., Ltd., Yokohama, Japan

[21] Appl. No.: 124,273

[22] Filed: Feb. 25, 1980

[30] Foreign Application Priority Data

Feb. 24, 1979 [JP] Japan .................. 54-23380[U]

[51] Int. Cl.$^3$ .............................................. B06G 1/00
[52] U.S. Cl. .................. 280/688; 280/715; 280/724
[58] Field of Search ............... 280/688, 689, 690, 697, 280/701, 715, 724, 725, 726

[56] References Cited

U.S. PATENT DOCUMENTS

| 2,020,899 | 11/1935 | McIntyre | 267/11 A |
| 2,218,634 | 10/1940 | Best | 267/20 |
| 2,253,646 | 8/1941 | Paton | 267/11 |
| 2,300,844 | 11/1942 | Olley | 180/73 |
| 2,503,030 | 4/1950 | Crabtree | 188/88 |
| 2,833,552 | 5/1958 | Polhemus | 280/697 |
| 2,876,018 | 3/1959 | Kishline | 280/701 |
| 3,198,542 | 8/1965 | Harbers | 280/104.5 |

FOREIGN PATENT DOCUMENTS

| 340782 | 1/1978 | Australia . |
| 1755290 | 8/1971 | Fed. Rep. of Germany . |
| 2802631 | 7/1978 | Fed. Rep. of Germany . |
| 969829 | 12/1950 | France . |
| 1193105 | 10/1959 | France . |
| 1560951 | 3/1969 | France . |
| 423789 | 2/1935 | United Kingdom . |
| 891843 | 3/1962 | United Kingdom . |
| 1117581 | 6/1968 | United Kingdom . |
| 1186301 | 4/1970 | United Kingdom . |
| 1219911 | 1/1971 | United Kingdom . |
| 1320497 | 6/1973 | United Kingdom . |

Primary Examiner—Joseph F. Peters, Jr.
Assistant Examiner—John A. Carroll
Attorney, Agent, or Firm—Thompson, Birch, Gauthier & Samuels

[57] ABSTRACT

A stabilizing device for a vehicle suspension of an automotive vehicle. The stabilizing device is capable of stabilizing the vehicle and of absorbing shock exerted in any direction. The stabilizing device comprises a first and a second shock absorbing member. The first shock absorbing member is applied to the vehicle as a vehicle suspension which is disposed between the vehicle body or chassis and a suspension member. The second shock absorbing member is provided on the vehicle so that it indirectly absorbs a shock exerted on the vehicle. The second shock absorber provides a restoring force approximate ten times more than that of the first shock absorbing member. Further, the second shock absorbing member has a titled position so that it can absorb a force or shock exerted on the vehicle in forward, backward and lateral directions.

12 Claims, 3 Drawing Figures

STABILIZING DEVICE FOR A SUSPENSION OF AN AUTOMOTIVE VEHICLE

BACKGROUND OF THE INVENTION

1. Field of the Invention

The present invention relates to a suspension system for an automotive vehicle. More specifically, the invention relates to a stabilizing device for use with a suspension system for an automotive vehicle, particularly to a stabilizing device applied to such a vehicle having a rear coil-spring suspension.

2. Description of the Prior Art

As is well known to those skilled in the art, a vehicle body or vehicle chassis is suspended on front and rear vehicle wheel axles through a front and rear suspension system. One such suspension system is a coil spring suspension which includes shock absorbing means and suspension arms. The suspension arms comprise upper and lower control arms each of which has one end connected to the vehicle body or chassis and the other end connected to an axle housing for supporting the axle below the vehicle body. The shock absorbing means includes a coil spring and a shock absorber and is interposed between the vehicle body and the axle housing. The shock absorber acts to absorb road shock applied to the vehicle in the vertical direction by compressing and expanding. However, sufficient flexibility is required for the comfort of those riding the vehicle, and also sufficient stiffness in the suspension is required to effectively absorb road shocks to prevent the vehicle from rough riding. Since the shock absorber means directly connects the vehicle body and the axle housing and since if it is too stiff it will transmit road shock so as not to provide a smooth ride, the stiffness of the shock absorbers has conventionally been limited so as not to degrade the comfort of riding. In consideration of the comfort of passengers in the vehicle, the power of a coil-spring rear suspension is limited to a lower range than that required to stabilize the vehicle body. In practice, the power of a rear suspension is limited to a range of a maximum of 30 kg/0.1 m/sec. Thus, the suspension system actually supplies insufficient stabilizing force for the vehicle.

For the purpose of assisting the suspension to stabilize the vehicle, there are provided resilient bushings including shock absorbing rubber members at the various joints, such as the joints between the upper and lower arms and the chassis or vehicle body. The bushings are also intended to absorb vibrations of the axle housing which otherwise create uncomfortable noise. However, the ability of bushings to absorb road shocks exerted on the vehicle and vibrations of the axle housing is limited by the required strength of suspension for the vehicle. Therefore, such bushings are inadequate to simultaneously stabilize the vehicle and to absorb the vibrations of the axle housing.

In the prior art, there have been suspension systems having shock absorbing means cooperating with the vehicle suspension for absorbing road shocks. As such an absorbing means is directly connected to the vehicle chassis or body at least at one end thereof, it has also been limited in the stabilizing force it can provide. This may cause inadequacy of stability for the vehicle suspension system relative to that required. Further, when the vehicle is rapidly decelerated during driving, inertia and reaction thereto will be applied to the vehicle in the forward and backward directions. Since a conventional vehicle suspension is provided for the purpose of absorbing forces and stabilizing the vehicle in response to vertical forces applied to the vehicle, it cannot absorb forces applied in the forward and backward directions. The vehicle may also be subject to forces in the lateral direction which are caused when the vehicle corners at high speed or travels around sharp corners. For such forces applied to the vehicle in the forward or backward direction or lateral direction, the conventional suspension may not effectively stabilize the vehicle. In such a case, mere bushings will not be sufficient to absorb the force.

The present invention is to provide an improved suspension system which can solve the above-mentioned difficulties and disadvantages of a conventional vehicle suspension system.

SUMMARY OF THE INVENTION

Therefore, it is an object of the present invention to provide a vehicle suspension system capable of providing sufficient stability against at least vertical and forward and backward forces.

Another object of the present invention is to provide an improved suspension system having a second shock absorber cooperative with the vehicle suspension, which is indirectly connected to the vehicle chassis or vehicle body.

A further object of the present invention is to provide an improved suspension system having a shock absorber which is positioned so that it can absorb a force in any direction.

The other objects and advantages sought in the present invention will become more apparent from the hereafter described preferred embodiment of the invention.

BRIEF DESCRIPTION OF THE DRAWINGS

The present invention will become more fully understood from the detailed description given below, and the accompanying description of the preferred embodiment of the present invention, which, however, are not to be taken as limiting the present invention in any way, but are for the purpose of illustration and explanation only.

In the drawings.

DESCRIPTION OF THE PREFERRED EMBODIMENT

Figure 1:
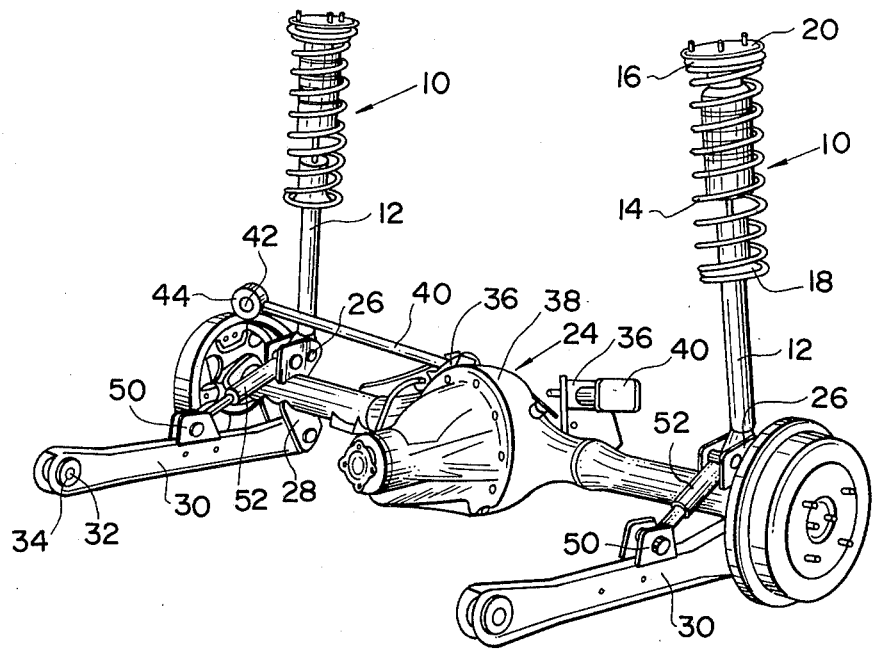
FIG. 1 is a perspective view of a rear suspension system for an automotive vehicle in accordance with the present invention, wherein the vehicle frame and vehicle body are omitted for clarity.
Figure 2:
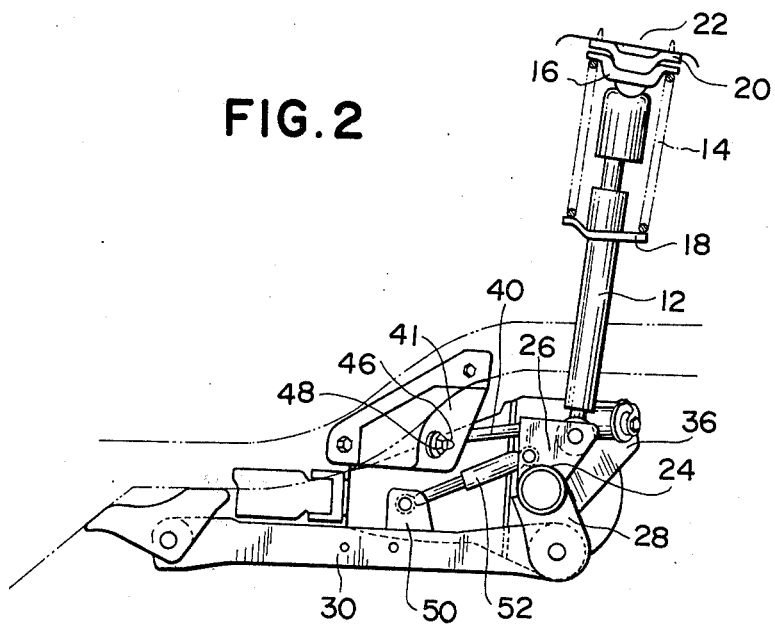
FIG. 2 is a side elevational view of the rear suspension system of FIG. 1.

For illustration only and having no intention to limit the present invention, there is illustrated in detail a preferred embodiment of a vehicle suspension system in accordance with the present invention. Referring now to FIGS. 1 and 2, there is illustrated a preferred embodiment of the vehicle suspension system for an automotive vehicle using a coil-spring suspension. It should be noted that although FIGS. 1 and 2 show generally a rear portion of the vehicle, the suspension system according to the present invention may also be used on the front portion of the vehicle.

The suspension system includes a two coil-spring rear suspension system 10. In practice, however, the rear-suspension system 10 may employ any type of shock absorber, such as hydropneumatic and so on. Therefore, although, in the preferred embodiment, a coil-spring rear suspension system is employed, it is not intended to limit the present invention. The coil-spring rear-suspension system 10 comprises on both left and right sides a first shock absorber 12 and a coil-spring 14 interposed between upper and lower spring flanges 16 and 18. The shock absorber 12 with coil spring 14 can be mounted on the vehicle in the various manners, in practice. The mounting manner illustrated in FIGS. 1 and 2 is merely one example. At the top of the rear suspension, a bracket 20 for mounting the suspension 10 to a vehicle chassis or a vehicle body 22 (only shown in FIG. 2) is provided. At the lower end of the suspension 10, the shock absorber 12 is connected to a rear axle housing 24 through a bracket 26 fixed to the rear axle housing and protruding upward therefrom. Opposite to the bracket 26, the rear axle housing 24 is provided with a downwardly protruding bracket 28. Through the bracket 28, a lower control arm 30 is secured to the rear axle housing 24 at one end thereof. The other end of the lower control arm 30 is secured to the vehicle chassis or body 22, as shown in FIG. 2. Both ends of the lower control arm 30 are provided with holes 32 (only the hole at the end adjacent the vehicle body 22 is shown in FIG. 1) to receive installation bolts (not shown). A bushing 34 including a rubber element runs through each hole 32 for shock absorbing purposes. The rear axle housing 24 is further provided with a pair of brackets 36 adjacent the differential housing 38 which is formed integrally with the axle housing 24. Through the bracket 36, one end of an upper control arm 40 is connected to the differential housing 38. The other end of the upper control arm 40 is pivotably connected to the vehicle chassis or vehicle body 22 through a bracket 41 fixed to the lower portion of the vehicle chassis or body 22. The upper control arm 40 is formed with hole 42 at each end thereof. Through the opening 42, a bushing 44 including a rubber bumping element is provided for shock absorbing purposes. The bushing 44 mounted on the end adjacent the vehicle body receives a pivot bolt 46 engaging with a nut 48.

The lower control arm 30 is provided with an upwardly protruding bracket 50 at an intermediate portion thereof. Between the brackets 26 and 50, is disposed a second shock absorber 52, of which one end is connected to the bracket 26 and the other end is connected to the bracket 50. In consideration of the comfort of passengers in the vehicle, the strength of the coil-spring rear suspension 10 is limited to a lower range than that required to stabilize the vehicle body. In practice, the power of rear suspension is limited to a maximum of 30 kg/0.1 m/sec. The reason for this limitation of the suspension power is that the suspension directly connects the vehicle chassis or vehicle body 22 to the axle housing 24 so that displacements in the special relationship between the vehicle body and the axle housing may be directly transmitted to the vehicle body 22. Since the shock absorber 52 interposed between the axle housing 24 and the lower arm 30 is only indirectly connected to the vehicle chassis or body, it cannot directly transmit to the vehicle body road shock acting upon it, and acts as a shock absorber for absorbing road shock and rebound. Therefore, the shock absorber 52 assists to stabilize the vehicle body satisfactorily. Actually, in accordance with the preferred embodiment, a shock absorber 52 having a maximum resilience value of approximately 100 kg/0.1 m/sec can be employed.

The shock absorber 52 cooperates with the suspension 10 as follows. When the vehicle body 22 is displaced relative to the vehicle wheels by unevenness of the road, for example, the suspension 10 acts to absorb road shock and rebounding thereto, and the shock absorber 52 also acts to absorb the road shock. If the vehicle is rapidly decelerated, inertia and the reaction thereto will be applied to the vehicle body. In this event, the suspension cannot absorb the forward and backward forces applied to the vehicle body. The shock absorber 52 then acts to absorb the force of inertia with sufficient stabilizing force. Thereby, the vehicle can be prevented from rough riding, even when it is rapidly decelerated, so as to give a comfortable ride.

Figure 3:
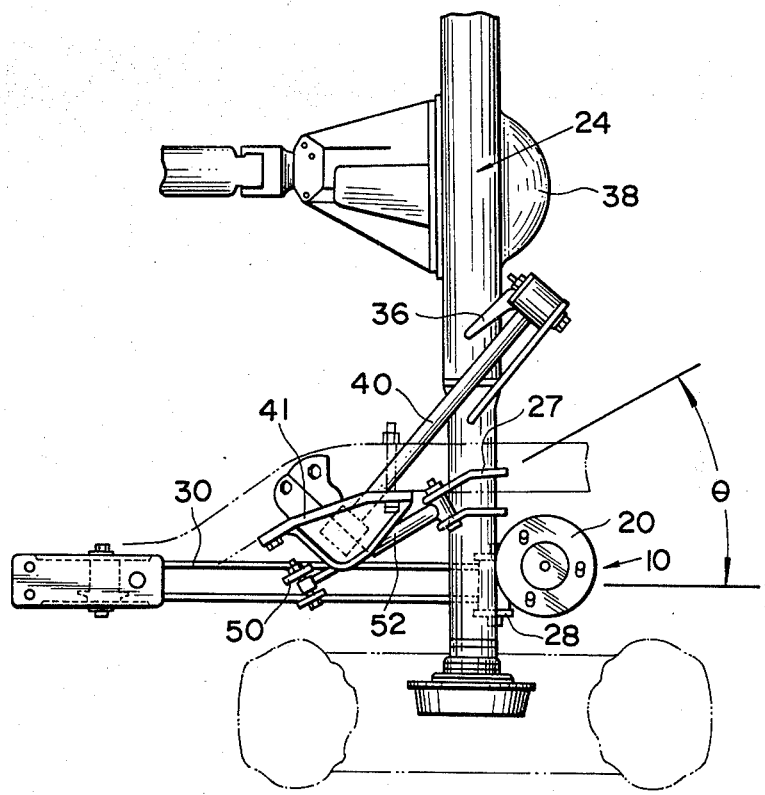
FIG. 3 is a plan view showing a modification of the preferred embodiment of the invention illustrated in FIG. 1, in which the shock absorber is tilted vertically and laterally so that it can absorb a force exerted on the vehicle in any direction.

It will be apparent that in FIG. 2, the shock absorber 52 is tilted from the vertical direction so as to absorb vertical and forward and backward forces applied to the vehicle. Although, in the preferred embodiment, the shock absorber 52 is connected to the axle housing 24 through the bracket 26 which also connects the shock absorber 12 of the suspension 10 to the axle housing, it can be embodied otherwise, for example as is illustrated in FIG. 3. In FIG. 3, the shock absorber 52 is connected to the axle housing 24 through a bracket 27 which is fixed to the axle housing 24, so that the shock absorber is also tilted in the lateral direction at an angle $\theta$. In this example, the shock absorber 52 can absorb the forces applied to the vehicle not only in the vertical and forward and backward directions but also in the lateral direction.

Although the above description is of a preferred embodiment in which the shock absorber 52 is interposed between the axle housing 24 and the lower arm 30, it can also be provided between the axle housing 24 and upper arm 40 or between upper and lower arms 40 and 30. In these cases, the shock absorber 52 can have substantially the same effect as in the aforementioned embodiments.

As mentioned above, the suspension system according to the present invention can stabilize the vehicle with sufficient power for absorbing forces applied thereto. Further, the suspension system can prevent the axle carrier and/or axle housing from vibrating which creates shock and noise. Yet further, as the shock absorber 52 is indirectly connected to the vehicle body and will not impart to the vehicle road shock or reaction thereto, it can be provided with greater power in comparison with the shock absorber of the suspension so as to simplify the planning of the vehicle suspension system.

While the present invention has been shown and described in detail in terms of preferred and modified embodiments, it should not be considered as limited to these. Further variations to any particular embodiments may be made without departing from the scope of the present invention, which is limited solely by the accompanying claims.

What is claimed is:

1. A device for stabilizing the suspension system of an automotive vehicle comprising:
   first shock absorbing means substantially vertically interposed between the vehicle body and the axle housing, said first shock absorbing means being compressed and expanded in response to generally vertical road shocks;

a pair of lower control arms disposed adjacent both ends of the axle housing and extending normally with respect thereto for mounting the axle housing below the vehicle body; and second shock absorbing means non-vertically interposed between the axle housing and said pair of lower control arms, said second shock absorbing means being compressed and expanded in response to generally non-vertical as well as vertical shocks, said second shock absorbing means having a greater absorbing and stabilizing power than said first shock absorbing means.

2. A device, as claimed in claim 1, further having a pair of upper control arms, each said arm being connected at one of its ends to the axle housing and at the other of its ends to the vehicle body.

3. A device, as claimed in claim 2, wherein said second shock absorbing means is interposed between said lower control arms and said upper control arms.

4. A device, as claimed in claim 2, wherein said second shock absorbing means is interposed between the axle housing and said upper control arms.

5. A device as claimed in claim 1 or 2, further having bracket means affixed to the axle housing, said bracket means being connected to the lower end of said first shock absorbing means and the rear end of said second shock absorbing means.

6. A device as claimed in claim 1 or 2, wherein said second shock absorbing means is disposed in a position which is tilted from the vertical and tilted from the main axis of the vehicle.

7. A device as claimed in any one of claims 1 through 4, wherein said second shock absorbing means has a maximum absorbing and restoring force of 100 kg/0.1 m/sec.

8. A suspension structure for an automotive vehicle comprising:
a vehicle body;
an axle housing for the vehicle wheels;
an upper suspension member connected to said vehicle body at one end and connected to said axle housing at the other end thereof;
a lower suspension member connected to said vehicle body at one end and connected to said axle housing at the other end thereof;
a first shock absorber interpositioned between said vehicle body and said axle housing, said first shock absorber having a force absorbing capability smaller than that required for stabilizing the vehicle; and
a second shock absorber interpositioned between said axle housing and said lower suspension member in a vertically tilted position, said second shock absorber having a force absorbing capability greater than that of said first shock absorber and great enough to absorb the shock forces applied to the vehicle in cooperation with said first shock absorber.

9. A rear suspension structure for an automotive vehicle comprising:
a vehicle body;
a rear axle housing incorporating a differential housing and rotatably mounting rear wheels at both ends thereof;
upper and lower suspension members respectively connecting said vehicle body and said axle housing;
a first shock absorber interpositioned between said vehicle body and said rear axle housing in a substantially vertical position; and
a second shock absorber interpositioned between said rear axle housing and one of said suspension members in a position such that said second shock absorber absorbs road shock in cooperation with said first shock absorber, said second shock absorber having a force absorbing capability greater than that of said first shock absorber.

10. A structure as claimed in claim 8 or 9, further having bracket means on said axle housing, said first and second shock absorbers being connected to said axle housing bracket means.

11. A structure as claimed in claim 8 or 9, wherein said second shock absorber is mounted in a vertically and laterally tilted position for absorbing road shock applied to the vehicle in various directions.

12. A structure as claimed in claim 8 or 9, wherein said second shock absorber has a force absorbing capability which is approximately three times greater than that of said first shock absorber.

* * * * *